(12) United States Patent
De Pelsemaeker et al.

(10) Patent No.: US 12,478,263 B2
(45) Date of Patent: Nov. 25, 2025

(54) DISEASE DETECTION SYSTEM

(71) Applicant: Valeo Systemes Thermiques, Le Mesnil-Saint-Denis (FR)

(72) Inventors: Georges De Pelsemaeker, Le Mesnil-Saint-Denis (FR); William Lapierre, Le Mesnil-Saint-Denis (FR); Shivakumar Puttaswamy, Le Mesnil-Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 463 days.

(21) Appl. No.: 17/924,183

(22) PCT Filed: May 6, 2021

(86) PCT No.: PCT/EP2021/062048
§ 371 (c)(1),
(2) Date: Nov. 9, 2022

(87) PCT Pub. No.: WO2021/228690
PCT Pub. Date: Nov. 18, 2021

(65) Prior Publication Data
US 2023/0172562 A1    Jun. 8, 2023

(30) Foreign Application Priority Data

May 11, 2020    (FR) ..................... 2004631

(51) Int. Cl.
*A61B 5/0205*    (2006.01)
*A61B 5/00*    (2006.01)
(Continued)

(52) U.S. Cl.
CPC ............ *A61B 5/02055* (2013.01); *A61B 5/01* (2013.01); *A61B 5/6893* (2013.01); *A61B 5/0816* (2013.01)

(58) Field of Classification Search
CPC ........... A61B 5/01; A61B 5/02; A61B 5/0205; A61B 5/02055
See application file for complete search history.

(56) References Cited

U.S. PATENT DOCUMENTS 11,170,894 B1 * 11/2021 Kocher ................ A61B 5/1176
2017/0150930 A1 * 6/2017 Shikii ................... A61B 5/026
(Continued)

FOREIGN PATENT DOCUMENTS

| CN | 106821382 A | 6/2017 |
| CN | 107638172 A | 1/2018 |

(Continued)

OTHER PUBLICATIONS

Sun Guanghao et al.; "An infectious disease/fever screening radar system which stratifies higher-risk patients within ten seconds using a neural network and the fuzzy grouping method;" Journal of Infection, Academic Press, London, GB; vol. 70; No. 3; Dec. 23, 2014; pp. 230-236; XP029164978; Retrieved from the Internet: URL: https://www.doi.org/10.1016/J.JINF.2014.12.007 (7 pages).

(Continued)

*Primary Examiner* — Carolyn A Pehlke
(74) *Attorney, Agent, or Firm* — Osha Bergman Watanabe & Burton LLP

(57) ABSTRACT

The present invention relates to a system (1) for detecting a disease in a person, in particular a contagious disease such as COVID-19, this detection system comprising: —an acquisition device (7) for acquiring examination data on the person, this acquisition device comprising, in particular, at least one physiological measurement sensor such as a radar, and a thermal camera for acquiring this examination data, —a data processing device (3) arranged to receive this examination data obtained by the acquisition device, —a display device (30) arranged to display diagnostic information on the disease based on an analysis of the examination (Continued)

data, this diagnostic information possibly being representative of a level of probability that the person has the disease.

14 Claims, 2 Drawing Sheets

(51) Int. Cl.
  *A61B 5/01* (2006.01)
  *A61B 5/08* (2006.01)

(56) References Cited

U.S. PATENT DOCUMENTS

| | | | |
|---|---|---|---|
| 2017/0231544 A1 | 8/2017 | Satoi et al. | |
| 2018/0116579 A1 | 5/2018 | Omi | |
| 2020/0194115 A1* | 6/2020 | Chou | A61B 5/0077 |

FOREIGN PATENT DOCUMENTS

| | | |
|---|---|---|
| JP | 2009172176 A | 8/2009 |
| WO | 2015/125322 A1 | 8/2015 |

OTHER PUBLICATIONS

Yu Yao et al.; "Multiple Vital-Sign-Based Infection Screening Outperforms Thermography Independent of the Classification Algorithm;" IEEE Transactions on Biomedical Engineering; vol. 63, No. 5; May 19, 2016; pp. 1025-1033; XP011606785; Retrieved from the Internet: URL: https://www.doi.org/10.1109/TBME.2015.2479716 (9 pages).

Toshiaki Negishi et al.; "Contactless Vital Signs Measurement System Using RGB-Thermal Image Sensors and Its Clinical Screening Test on Patients with Seasonal Influenza;" Sensors; vol. 20, No. 2171; Apr. 13, 2020; pp. 1-16; XP055759477; Retrieved from the Internet: URL: https://www.doi.org/10.3390/s20082171 (16 pages).

International Search Report and Written Opinion issued in corresponding International Application No. PCT/EP2021/062048, mailed Jun. 18, 2021 (15 pages).

International Search Report issued in corresponding PCT Application No. PCT/EP2021/062048, mailed Jun. 18, 2021 (7 pages with English Translation).

Written Opinion of the International Searching Authority issued in corresponding PCT Application No. PCT/EP2021/062048, mailed Jun. 18, 2021 (14 pages with English Translation).

Office Action issued in counterpart Chinese Patent Application No. 202180034087.2 mailed Jul. 25, 2024 (12 pages).

* cited by examiner

DISEASE DETECTION SYSTEM

The present invention relates to a system for detecting a disease in a person, notably a contagious disease such as an acute respiratory distress disease like COVID-19.

Potential COVID-19 patients are currently detected by taking a temperature, supplementary clinical examinations, then by a COVID-19 test which still possesses a relatively low confidence level. A pulmonary scanner can confirm the seriousness of the disease with a good level of precision.

There is a great need to rapidly detect, notably by virtue of mobile means, potential patients with a contagious disease, for example the disease linked to COVID-19.

One subject of the invention is thus a system for detecting a disease in a person, notably a contagious disease such as COVID-19, this detection system comprising:

- an acquisition device for acquiring examination data on the person, this acquisition device notably comprising at least one physiological measurement sensor such as a radar, and a thermal camera for acquiring these examination data,
- a data processing device arranged to receive these examination data obtained by the acquisition device,
- a display device arranged to display diagnostic information for diagnosing the disease based on an analysis of said examination data, it being possible for this diagnostic information to be representative of a level of probability that the person is infected with the disease.

According to one of the aspects of the invention, the data processing device comprises an artificial intelligence unit arranged to process the examination data obtained by the acquisition device and provide said diagnostic information.

According to one of the aspects of the invention, the data processing device and the display device form part of the same apparatus, for example a computer, notably a portable computer.

In this case, the display device is a screen of the portable computer and the data processing device comprises a microprocessor of this computer.

In a variant, the display device is arranged to be visible to the person examined, and notably the display device, which notably comprises a screen, is remote from the data processing device, these display and data processing devices being, for example, connected to one another by a wireless connection, for example by a 3G, 4G or 5G communication protocol, or by the Internet or Wi-Fi, for example.

According to one of the aspects of the invention, the display device, and possibly also the data processing device, are arranged to be installed in a motor vehicle.

As a variant, the display device, and possibly also the data processing device, are arranged to be placed in a fixed manner, in a building or an external courtyard, for example.

According to one of the aspects of the invention, the processing device is arranged to make the diagnosis automatically, without human intervention.

As a result of automatic processing, the invention makes rapid diagnosis and/or mass screening possible, making it possible to return to work or lift a lockdown more rapidly.

According to one of the aspects of the invention, the acquisition device for acquiring examination data is arranged to make possible contactless measurements, at a safe distance, of vital signs and thermal and visible imaging on the person to be examined.

The system according to the invention thus advantageously uses the amalgamation of contactless measurements, at a safe distance, of vital signs, and of thermal and visible imaging.

According to one of the aspects of the invention, the artificial intelligence unit is arranged to use a diagnostic model based on an artificial intelligence and fed by a reasonable number of clinical measurements.

The invention, as a result of relatively light equipment, notably makes possible facilitated deployment of field hospitals to support populations.

The invention makes it possible to perform diagnoses in a mobile manner. It is easy to put in place, for example using a thermal camera, a physiological measurement sensor such as a radar and a portable personal computer. The invention makes it possible for it to be set up rapidly over a whole area.

According to one of the aspects of the invention, the acquisition device comprises a radar for acquiring data relating to the vital signs of the person, a thermal camera for temperature measurements providing temperature data, and a camera operating in the visible spectrum for characterizing the person tested, providing data for characterizing the person.

According to one of the aspects of the invention, the data processing device is arranged to run a diagnostic algorithm based on an amalgamation of vital data, notably respiratory rate, respiration amplitude, inhalation and exhalation time, heart rate and arrhythmia.

According to one of the aspects of the invention, the algorithm uses temperatures measured in noteworthy areas, located by processing the image, or indeed the oxygen level linked to the person examined.

Preferably, these noteworthy areas for temperature measurement are located inside the mouth, on the tip of the nose, on the cheeks and the palm of the hand.

According to one of the aspects of the invention, the diagnostic algorithm uses a characterization of the person, such as age, gender, clothing, size and body mass index, also called BMI, data.

According to one of the aspects of the invention, the system is arranged to acquire examination data until the diagnostic information is made available within a time period notably of between 30 and 120 seconds.

According to one of the aspects of the invention, the system is arranged to make it possible to acquire the examination data by making measurements at a distance of 60 cm to 2 m between the acquisition device and the person. It avoids the person having to be in contact with the acquisition device.

The invention thus makes possible a rapid diagnosis without additional time for being directed to a doctor, for example. The diagnostic information may, where applicable, be sent automatically to a doctor and may be held on a data storage system of cloud type.

According to one of the aspects of the invention, the data processing device uses an algorithm for analyzing the examination data acquired and, where applicable, for sorting people with the aim of detecting the cases of diseased people, based on all of the data collected and an artificial intelligence, the first level of training of which is performed on a sample in a hospital setting.

This training of the artificial intelligence may be performed by means of a set of measurements which is collected by the system, but also by means of medical monitoring of the patients. This makes improvement of the model over time possible.

According to one of the aspects of the invention, the measurements performed by the acquisition device may serve to subsequently refine the diagnosis made by the artificial intelligence.

By virtue of the invention, a diagnosis may be made without contact with the person, thereby limiting the risks of contamination, this being particularly advantageous, for example, in the case of a pandemic such as that linked to COVID-19.

According to one of the aspects of the invention, the examination data measured comprise at least one of the following data: temperatures measured at different points of the body of the person to be examined, a respiratory or a cardiac characteristic.

According to one of the aspects of the invention, the acquisition device is arranged to acquire examination data comprising an external temperature, a temperature measured on a cheek of the person, a temperature measured on the tip of the nose of the person, and also, where applicable, a maximum temperature of the face and a temperature of a garment or of a surface at a controlled reference temperature.

According to one of the aspects of the invention, the noteworthy measurement points are located by an artificial intelligence by means of an object identification flowchart.

According to one of the aspects of the invention, the temperature relating to a noteworthy point is obtained by averaging over time and by averaging the temperatures of a surface defined by pixels originating from an image from an infrared camera in proximity to the noteworthy point identified on the visible image by means of an object identification algorithm.

According to one of the aspects of the invention, the personal characterizations are identified by means of the red green blue camera (or RGB camera) or far infrared camera (FIR camera) in addition to reading the identity of the person, by virtue of a classification system which may be trained on RGB (red green blue) or infrared images. Using a larger number of parameters, notably age, gender, size, body mass index and phenotype, for example, serves to improve the diagnostic models.

According to one of the aspects of the invention, the diagnostic model, or diagnostic algorithm, which is fed with more data, such as noteworthy temperatures of the body, an ambient temperature, a class of personal characteristics and a time of day, may be arranged to use, in addition, data on the movements of the person examined in order to check whether they have come into contact with a diseased person or have passed through an at-risk area.

According to one of the aspects of the invention, the system is arranged to operate in the absence of a radar and by using the RGB cameras in order to estimate the cardiac and respiratory parameters.

According to one of the aspects of the invention, the temperature relating to a noteworthy point may be obtained by averaging over time and by averaging the temperatures of a surface defined by pixels originating from an image from a camera in proximity to the noteworthy point. The noteworthy point is, for example, defined geometrically by means of an image area called a building box, which surrounds it, for example by means of the geometrical average of the sides of the area of the image. This image area is a surface delimited by a series of points which is constructed by an object identification algorithm.

According to one of the aspects of the invention, the system lacks an RGB camera and/or does not use the surface the temperature of which is controlled. In this case, the system uses the external temperature and a model of heat transfer on the clothed areas or indeed only the differences in temperature between the noteworthy points.

According to one of the aspects of the invention, the system is arranged to use an amalgamation of contactless measurements, notably of vital signs, and of thermal and visible imaging.

The diagnostic information comprises a class chosen from among three predetermined classes, which are "Healthy person", "Person suspected to have the disease" and "Person highly likely to have the disease".

The diagnostic information may also comprise an evaluation of the severity of the disease.

Another subject of the invention is a method for providing diagnostic information for detecting a disease in a person, notably a contagious disease such as COVID-19, this method comprising the following steps:

acquiring examination data on the person, using an acquisition device notably comprising at least one physiological measurement sensor such as a radar, and a thermal camera for acquiring these examination data, receiving these examination data obtained by the acquisition device, processing these examination data in order to obtain diagnostic information for diagnosing the disease based on an analysis of said examination data, displaying diagnostic information for diagnosing the disease based on an analysis of said examination data, it being possible for this diagnostic information to be representative of a level of probability that the person is infected with the disease.

The present invention may make checks possible in the public realm in general, notably on lanes of human traffic, at entrances and exits of buildings, at airport gates and in schools.

The present invention also makes medical monitoring of people possible, for example for diseased people receiving home care.

The invention and its various applications will be better understood upon reading the description which follows and upon studying the figures which accompany it:

FIG. 1 schematically illustrates a system according to a non-limiting embodiment of the invention.

FIGS. 1 and 2 show a system 1 for detecting a disease in a person, notably a contagious disease such as COVID-19, according to the invention.

This system 1 comprises:

an acquisition device 7 for acquiring examination data on the person, a data processing device 3 arranged to receive these examination data obtained by the acquisition device 7, a display device 30 arranged to display diagnostic information for diagnosing the disease based on an analysis of said examination data, it being possible for this diagnostic information to be representative of a level of probability that the person is infected with the disease.

This system 1 comprises, in particular:

a sensor for sensing the cardiac activity of at least one passenger, in this instance the heart rate, this sensor being a camera operating in the near infrared, a sensor for sensing the respiratory activity, notably in respiratory amplitude and/or frequency terms, of at least one passenger, this sensor being a camera operating in the far infrared, or thermal camera, a radar arranged to measure vital signs of the person, a sensor for sensing the profile characteristics of the passenger, notably their gender, weight, size and age, this sensor being in this instance a red green blue camera, also called an RGB camera, a card reader for reading an identity card of the person and obtaining personal data of the person.

Figure 1:
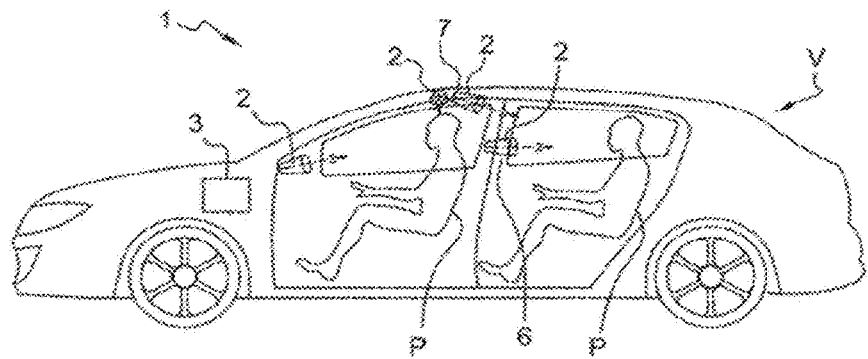

These sensors and cameras, which form part of the acquisition device 7, are shown by the reference symbol 2 in FIG. 1. Certain sensors 2 are, for example, positioned in the roof of the vehicle. One of the other cameras 2 is positioned in a side pillar 6 of the vehicle V.

The heart rate and respiration sensor may be in the back of the seat or in the center console level with the thigh of the passenger, this being non-limiting.

These sensors 2 are connected in order to exchange information with a data processing device 3 placed on the vehicle V.

The data processing device 3 comprises an artificial intelligence unit arranged to process the examination data obtained by the acquisition device 7 and provide said diagnostic information.

The data processing device 3 and the display device 30 form part of the same apparatus, for example a computer, notably a portable computer.

In this case, the display device 30 is a screen of the portable computer and the data processing device comprises a microprocessor of this computer.

The display device 30 is arranged to be visible to the person examined, and notably the display device, which notably comprises a screen, is remote from the data processing device, these display and data processing devices being, for example, connected to one another by a wireless connection, for example by a 3G, 4G or 5G communication protocol, or by the Internet or Wi-Fi, for example.

The display device 30, and also the data processing device 3, are in this instance arranged to be installed in a motor vehicle.

As a variant, the display device 30, and possibly also the data processing device 3, are arranged to be placed in a fixed manner, in a building or an external courtyard, for example.

The processing device 3 is arranged to make the diagnosis automatically, without human intervention.

The acquisition device 7 for acquiring examination data is arranged to make possible contactless measurements, at a safe distance, of vital signs and thermal and visible imaging on the person to be examined.

The system according to the invention thus advantageously uses the amalgamation of contactless measurements, at a safe distance, of vital signs, and of thermal and visible imaging.

The artificial intelligence unit is arranged to use a diagnostic model based on an artificial intelligence and fed by a reasonable number of clinical measurements.

The invention makes it possible to perform diagnoses in a mobile manner. It is easy to put in place, for example using a thermal camera, a physiological measurement sensor such as a radar and a portable personal computer.

The acquisition device 7 comprises a radar for acquiring data relating to the vital signs of the person, a thermal camera for temperature measurements providing temperature data, and a camera operating in the visible spectrum for characterizing the person tested, providing data for characterizing the person.

The data processing device 3 is arranged to run a diagnostic algorithm based on an amalgamation of vital data, notably respiratory rate, respiration amplitude, inhalation and exhalation time, heart rate and arrhythmia and oximetry.

The algorithm uses temperatures measured in noteworthy areas, located by processing the image.

Preferably, these noteworthy areas for temperature measurement are located inside the mouth, on the tip of the nose, on the cheeks and the palm of the hand.

The diagnostic algorithm uses a characterization of the person, such as age, gender, clothing, size and body mass index data.

The system is arranged to acquire examination data until the diagnostic information is made available within a time period notably of between 30 and 120 seconds.

The invention thus makes possible a rapid diagnosis without additional time for being directed to a doctor, for example. The diagnostic information may, where applicable, be sent automatically to a doctor and may be held on a data storage system 40 of cloud type.

The data processing device 3 uses an algorithm for analyzing the examination data acquired and, where applicable, for sorting people with the aim of detecting the cases of diseased people, based on all of the data collected and an artificial intelligence, the first level of training of which is performed on a sample in a hospital setting.

The measurements performed by the acquisition device may serve to subsequently refine the diagnosis made by the artificial intelligence.

By virtue of the invention, a diagnosis may be made without contact with the person, thereby limiting the risks of contamination, this being particularly advantageous, for example, in the case of a pandemic such as that linked to COVID-19.

According to one of the aspects of the invention, the examination data measured comprise at least one of the following data: temperatures measured at different points of the body of the person to be examined, a respiratory or a cardiac characteristic.

The acquisition device 7 is arranged to acquire examination data comprising an external temperature, a temperature measured on a cheek of the person, a temperature measured on the tip of the nose of the person, and also, where applicable, a maximum temperature of the face and a temperature of a garment or of a surface at a controlled reference temperature.

The noteworthy measurement points are located by an artificial intelligence by means of an object identification flowchart.

The personal characterizations are identified by means of the red green blue camera (or RGB camera) or far infrared camera (FIR camera) in addition to reading the identity of the person, by virtue of a classification system which may be trained on RGB (red green blue) or infrared images. Using a larger number of parameters, notably age, gender, size, body mass index and phenotype, for example, serves to improve the diagnostic models.

The diagnostic model, or diagnostic algorithm, which is fed with more data, such as noteworthy temperatures of the body, an ambient temperature, a class of personal characteristics and a time of day, may be arranged to use, in addition, data on the movements of the person examined in order to check whether they have come into contact with a diseased person or have passed through an at-risk area.

The temperature relating to a noteworthy point may be obtained by averaging over time and by averaging the temperatures of a surface defined by pixels originating from an image from a camera in proximity to the noteworthy point. The noteworthy point is, for example, defined geometrically by means of an image area called a building box, which surrounds it. This image area is a surface delimited by a series of points which is constructed by an object identification algorithm.

The diagnostic information comprises a class chosen from among three predetermined classes, which are "Healthy person", "Person suspected to have the disease" and "Person highly likely to have the disease".

Figure 2:
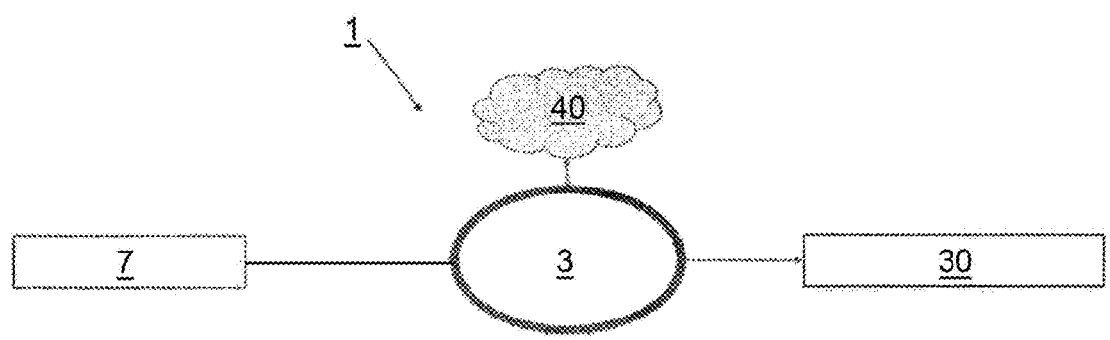
FIG. 2 illustrates a block diagram illustrating the hardware implemented in the system of FIG. 1.
Figure 3:
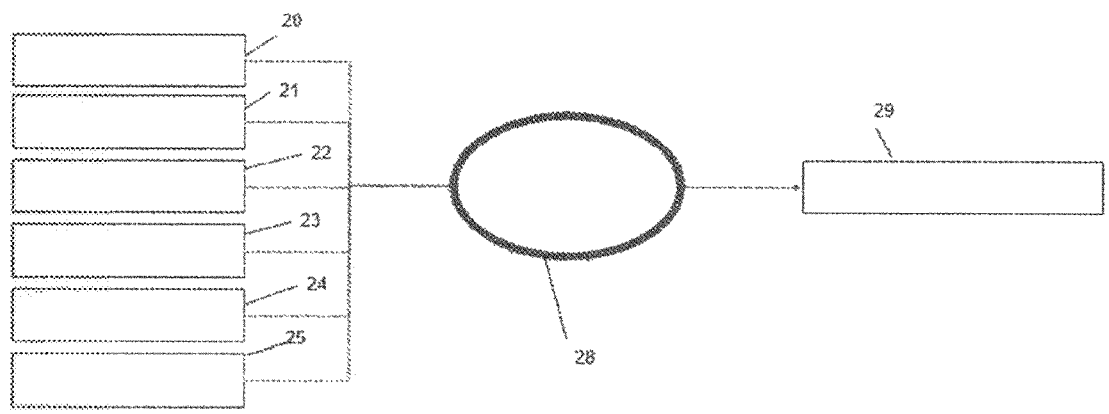
FIG. 3 depicts a block diagram illustrating the steps implemented in the system of FIG. 1.

The invention thus implements the following steps:
acquiring examination data on the person using the acquisition device 7 of FIG. 2, which are the steps 20 to 25 of FIG. 3,
receiving these examination data obtained by the acquisition device,
processing these examination data in order to obtain diagnostic information for diagnosing the disease based on an analysis of said examination data, using the data processing device 3 of FIG. 2 (step 28 of FIG. 3),
displaying diagnostic information for diagnosing the disease based on an analysis of said examination data, it being possible for this diagnostic information to be representative of a level of probability that the person is infected with the disease (step 29 of FIG. 3).

The steps 20 to 25 of FIG. 3 are the following:
the personal characterizations are identified by means of the red green blue cameras (or RGB cameras), which is the step 20,
acquiring the temperature of the person in the step 21 with a thermal camera of FIR type, the details of this temperature acquisition having already been described,
acquiring the respiratory rate in the step 22 using the FIR camera,
acquiring the heart rate in the step 23 using the camera in the near infrared, or NIR camera,
acquiring vital signs using the radar, in the step 24,
acquiring personal data using the card reader in the step 25,
potentially oximetry by the near infrared (NIR) camera.

The present invention also makes medical monitoring of people possible.

The examination data may, where applicable, comprise the size of the pupils and their position.

The diagnostic information is sent automatically to a remote data storage system of cloud type.

Likewise, the information which is useful to the diagnostic model, or diagnostic algorithm, may be received from the remote system of cloud type.

Potentially two, NIR and FIR, cameras are used. The FIR camera for the temperatures and the characteristics of the respiration and the NIR camera for the oximetry and the heart rate.

The acquisition device is notably arranged to acquire examination data comprising an external temperature, a temperature measured on a cheek of the person, a temperature measured on the tip of the nose of the person, and also, where applicable, a maximum temperature of the face and a temperature of a garment or of a surface at a controlled reference temperature, and, where applicable, a tidal volume, tremors and the blood oxygen level.

The invention claimed is:

1. A system for detecting a contagious disease in a person, the system comprising:
an acquisition device for acquiring examination data on the person, the acquisition device comprising: at least one physiological measurement sensor, a thermal camera, and a Near Infrared (NIR) camera;
a data processing device configured to receive the examination data obtained by the acquisition device; and
a display device configured to display diagnostic information for diagnosing the contagious disease based on an analysis of said examination data, where the diagnostic information represents a probability that the person is infected with the contagious disease,
wherein the thermal camera comprises a Far Infrared (FIR) camera configured to capture temperatures of the person and respiration characteristics of the person;
wherein the thermal camera is located in a back of a seat or in a center console of a vehicle containing the person, and
wherein the NIR camera is configured to capture an oximetry of the person and a heart rate of the person.

2. The system as claimed in claim 1,
wherein the data processing device comprises an artificial intelligence unit configured to process the examination data obtained by the acquisition device and provide said diagnostic information;
wherein the artificial intelligence unit is configured to utilize a classifier to determine the diagnostic information, and
wherein the artificial intelligence unit is trained using measurements collected by medically monitoring patients in a hospital setting.

3. The system as claimed in claim 1, wherein the data processing device and the display device form part of a same apparatus.

4. The system as claimed in claim 1, wherein the display device and the data processing device are configured to be installed in a motor vehicle.

5. The system as claimed in claim 1, wherein the data processing device is configured to utilize a classifier to make a diagnosis automatically, without human intervention.

6. The system as claimed in claim 1, wherein the acquisition device is configured to acquire contactless measurements comprising vital signs, and thermal and visible imaging.

7. The system as claimed in claim 1, wherein the at least one physiological measurement sensor comprises a radar for acquiring data relating to vital signs of the person, and wherein the acquisition device further comprises a camera operating in a visible spectrum configured to capture the examination data.

8. The system as claimed in claim 1,
wherein the data processing device is configured to run a classifier having inputs comprising one or more of: respiratory rate, respiration amplitude, inhalation time, exhalation time, the heart rate, and arrhythmia.

9. The system as claimed in claim 8, wherein the classifier uses temperatures measured in noteworthy areas, located by processing an image captured by the acquisition device.

10. The system as claimed in claim 9, wherein the noteworthy areas for temperature measurement comprise one or more of: an inside of a mouth of the person, on a tip of a nose of the person, on cheeks of the person, and on a palm of a hand of the person.

11. The system as claimed in claim 8, wherein the classifier uses a characterization of the person comprising one or more of: age, gender, clothing data, size, and body mass index.

12. The system as claimed in claim 1, wherein the examination data comprises at least one of: temperatures measured at different points of a body of the person to be examined, a respiratory characteristic, or a cardiac characteristic.

13. The system as claimed in claim 1, wherein the examination data comprises one or more of: an external temperature, a temperature measured on a cheek of the person, a temperature measured on a tip of a nose of the person, a maximum temperature of a face of the person, a temperature of a garment, a surface at a controlled reference temperature, a tidal volume, tremors, and a blood oxygen level.

14. The system as claimed in claim 1, wherein the data processing device uses a classifier for analyzing the examination data acquired and for detecting cases of diseased people, where the data processing device is trained on measurements collected by medically monitoring patients in a hospital setting.

\* \* \* \* \*